United States Patent
Takai (10) Patent No.: US 12,546,586 B2
(45) Date of Patent: Feb. 10, 2026

(54) NON-CONTACT PROBE AND PROFILE MEASUREMENT APPARATUS

(71) Applicant: MITUTOYO CORPORATION, Kanagawa (JP)

(72) Inventor: Toshihisa Takai, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 577 days.

(21) Appl. No.: 17/974,224

(22) Filed: Oct. 26, 2022

(65) Prior Publication Data

US 2023/0139573 A1 May 4, 2023

(30) Foreign Application Priority Data

Oct. 28, 2021 (JP) .................................. 2021-176229

(51) Int. Cl.
   *G01B 11/24* (2006.01)
   *G01S 7/481* (2006.01)

(52) U.S. Cl.
   CPC ............ *G01B 11/24* (2013.01); *G01S 7/4813* (2013.01); *G01S 7/4817* (2013.01)

(58) Field of Classification Search
   CPC ..... G01B 11/24; G01S 7/4813; G01S 7/4817; G02B 26/105; H02K 7/14
   USPC ...................................................... 359/223.1
   See application file for complete search history.

(56) References Cited

U.S. PATENT DOCUMENTS

| | | |
|---|---|---|
| 6,181,410 B1 | 1/2001 | Ishida et al. |
| 10,514,292 B2 | 12/2019 | Miyazaki |
| 2002/0150324 A1* | 10/2002 | Laor ..................... G02B 6/3572 |
| | | 359/223.1 |
| 2020/0132507 A1* | 4/2020 | Osada ....................... G01D 5/14 |
| 2020/0333463 A1* | 10/2020 | Sugihara ............... G01S 7/4817 |

FOREIGN PATENT DOCUMENTS

| | | | | |
|---|---|---|---|---|
| AT | 504145 B1 * | 3/2010 | ............. | G01B 11/24 |
| CN | 105115474 | 12/2015 | | |
| CN | 106501812 | 3/2017 | | |
| CN | 106501812 A * | 3/2017 | ............. | G01S 17/08 |
| CN | 107656540 | 2/2018 | | |
| JP | 62-133113 | 8/1987 | | |
| JP | 63-58133 | 3/1988 | | |
| JP | H08-29134 A | 2/1996 | | |
| JP | 2000-356752 | 12/2000 | | |
| JP | 2001-153611 | 6/2001 | | |
| JP | 2002-303817 | 10/2002 | | |
| JP | 2003-57570 | 2/2003 | | |

(Continued)

*Primary Examiner* — William R Alexander
*Assistant Examiner* — Alaina Marie Swanson
(74) *Attorney, Agent, or Firm* — Greenblum & Bernstein, P.L.C.

(57) ABSTRACT

A non-contact probe includes an irradiating part that radiates a laser beam, an irradiating mirror that reflects the laser beam from the irradiating part toward a workpiece, a light-receiving mirror that reflects the reflected light from the workpiece, and a galvano motor capable of swinging both the irradiating mirror and the light-receiving mirror. The irradiating mirror is provided at one axial end of the motor shaft that extends on both ends of the galvano motor, and the light-receiving mirror is provided at the other axial end of the motor shaft.

9 Claims, 8 Drawing Sheets

(56) References Cited

FOREIGN PATENT DOCUMENTS

| | | | |
|---|---|---|---|
| JP | 2003-307700 | | 10/2003 |
| JP | 2004-20956 | | 1/2004 |
| JP | 2008-180646 | | 8/2008 |
| JP | 2009-265005 | | 11/2009 |
| JP | 2011-203632 | | 10/2011 |
| JP | 2012-78098 | | 4/2012 |
| JP | 2015-130733 | | 7/2015 |
| JP | 2017-15459 | | 1/2017 |
| JP | 2017-90140 | | 5/2017 |
| JP | 2020-160312 | | 10/2020 |
| KR | 20160047492 | * | 5/2016 |

* cited by examiner

NON-CONTACT PROBE AND PROFILE MEASUREMENT APPARATUS

CROSS-REFERENCE TO RELATED APPLICATIONS

The present application claims priority to Japanese Patent Applications number 2021-176229, filed on Oct. 28, 2021 contents of which are incorporated herein by reference in their entirety.

BACKGROUND OF THE INVENTION

The present disclosure relates to a non-contact probe and a profile measurement apparatus. A profile measurement apparatus is provided with a non-contact probe that radiates a laser beam onto a workpiece to detect a profile of the workpiece in a non-contact manner. The non-contact probe is provided with a mirror that reflects the laser beam from an irradiating part toward the workpiece and reflects a reflected light from the workpiece toward the light receiving part. The mirror is disposed in a manner to be swingable by a galvano motor.

Since the above-mentioned mirror has a function of reflecting the laser beam from the irradiating part and a function of reflecting the reflected light from the workpiece, the mirror surface becomes large and the galvano motor that drives the mirror also becomes large. Further, since the galvano motor supports the mirror in a cantilever manner, the posture of the mirror may become unstable.

BRIEF SUMMARY OF THE INVENTION

The present disclosure focuses on these points, and its object is to provide a non-contact probe capable of driving a mirror in a stable posture with a small-sized galvano motor.

A first aspect of the present disclosure provides a non-contact probe including: an irradiating part that radiates a laser beam; a first mirror that reflects the laser beam from the irradiating part toward a workpiece; a second mirror that reflects a reflected light from the workpiece; and a galvano motor capable of swinging both the first mirror and the second mirror, wherein the first mirror is provided at a first axial end of a motor shaft that extends on both ends of the galvano motor, and the second mirror is provided at a second axial end of the motor shaft.

A second aspect of the present disclosure provides a profile measurement apparatus including: an irradiating part that radiates a laser beam; a first mirror that reflects the laser beam from the irradiating part toward a workpiece; a second mirror that reflects a reflected light from the workpiece toward a light receiving part; and a galvano motor capable of swinging both the first mirror and the second mirror; a calculation part that calculates a profile of the workpiece on the basis of an output of the light receiving part, wherein the first mirror is provided at a first axial end of a motor shaft that extends on both ends of the galvano motor, and the second mirror is provided at a second axial end of the motor shaft.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Outline of a Profile Measurement Apparatus>

An outline of a profile measurement apparatus including a non-contact probe according to an embodiment will be described with reference to FIG. 1.

Figure 1:
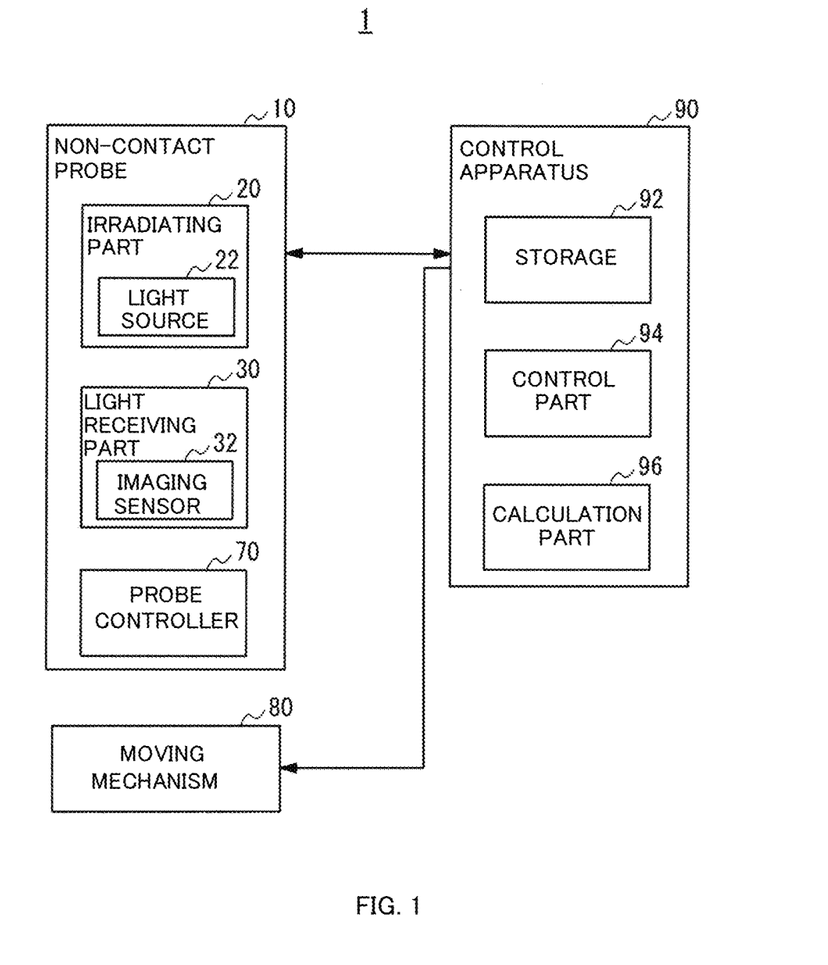
FIG. 1 is a schematic diagram illustrating an outline of a profile measurement apparatus 1.

FIG. 1 is a schematic diagram illustrating an outline of a profile measurement apparatus 1. The profile measurement apparatus 1 is a three-dimensional profile measurement apparatus that measures a three-dimensional profile of a workpiece which is an object to be measured, for example. As shown in FIG. 1, the profile measurement apparatus 1 includes a non-contact probe 10, a moving mechanism 80, and a control apparatus 90.

The non-contact probe 10 radiates a laser beam onto the workpiece placed on a surface plate, and captures an image of the workpiece on the basis of light reflected from a surface of the workpiece. The non-contact probe 10 includes an irradiating part 20, a light receiving part 30, and a probe controller 70. The detailed configuration of the non-contact probe 10 will be described later.

The irradiating part 20 radiates the laser beam onto the workpiece. The irradiating part 20 includes a light source 22. The light source 22 is formed of a laser diode (LD) or the like, for example, and generates and emits a laser beam of a predetermined wavelength.

The light receiving part 30 functions as an imaging part that receives the laser beam reflected by the workpiece and captures an image of the workpiece. The light receiving part 30 includes an imaging sensor 32. The imaging sensor 32 is an image sensor that captures the image of the workpiece. A CMOS image sensor is used as the image sensor, for example.

The probe controller 70 controls the operation of the non-contact probe 10. The probe controller 70 controls radiation of the laser beam by the light source 22 of the irradiating part 20 and imaging of the image of the workpiece by the imaging sensor 32 of the light receiving part 30.

The moving mechanism 80 moves the non-contact probe 10 relative to the workpiece. For example, the moving mechanism 80 moves the non-contact probe 10 in three axial directions orthogonal to each other. The non-contact probe 10 is detachably attached to the moving mechanism 80.

The control apparatus 90 controls the operation of the non-contact probe 10 and the moving mechanism 80. The control apparatus 90 performs the measurement using the non-contact probe 10 by moving the non-contact probe 10 with the moving mechanism 80, for example. The control apparatus 90 includes a storage 92, a control part 94, and a calculation part 96.

The storage 92 includes a read only memory (ROM) and a random access memory (RAM), for example. The storage 92 stores various types of data and a program executable by the control part 94. For example, the storage 92 stores a result of the measurement by the non-contact probe 10.

The control part 94 is a central processing unit (CPU), for example. The control part 94 controls the operation of the non-contact probe 10 via the probe controller 70 by executing the program stored in the storage 92. Specifically, the control part 94 controls the radiation of the laser beam to the workpiece by the irradiating part 20.

The calculation part 96 calculates the profile of the workpiece onto which the non-contact probe 10 radiates the laser beam. The calculation part 96 acquires an output of the light receiving part 30, and calculates the profile of the workpiece.

<Internal Configuration of the Non-Contact Probe>

An internal configuration of the non-contact probe 10 will be described with reference to FIGS. 2 to 8.

Figure 2:
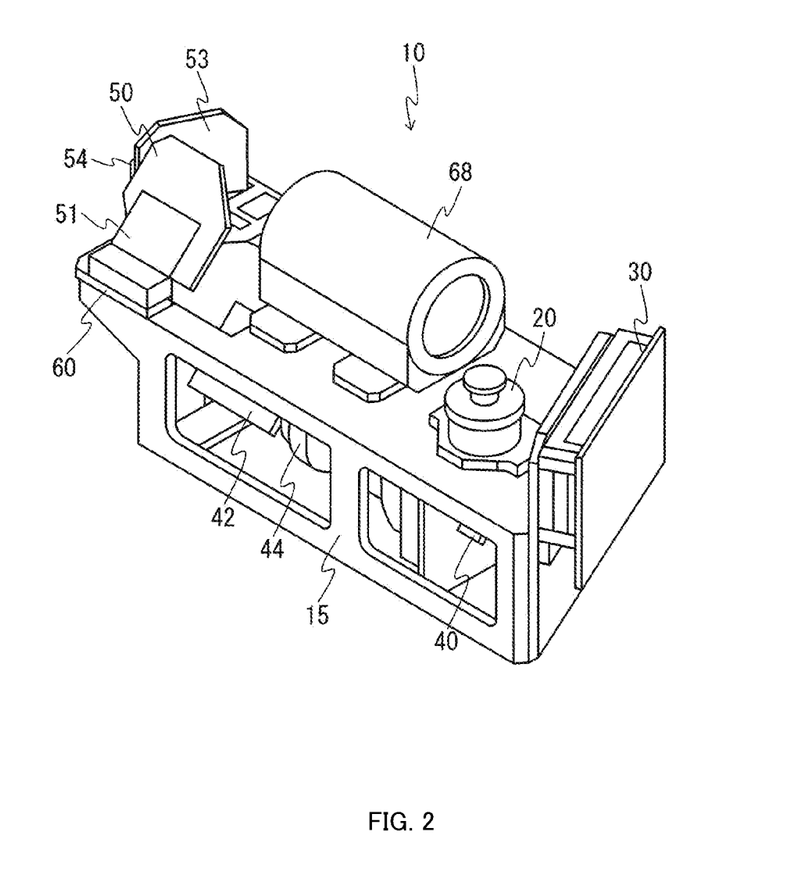
FIG. 2 is a schematic perspective view illustrating an internal configuration of a non-contact probe 10.
Figure 3:
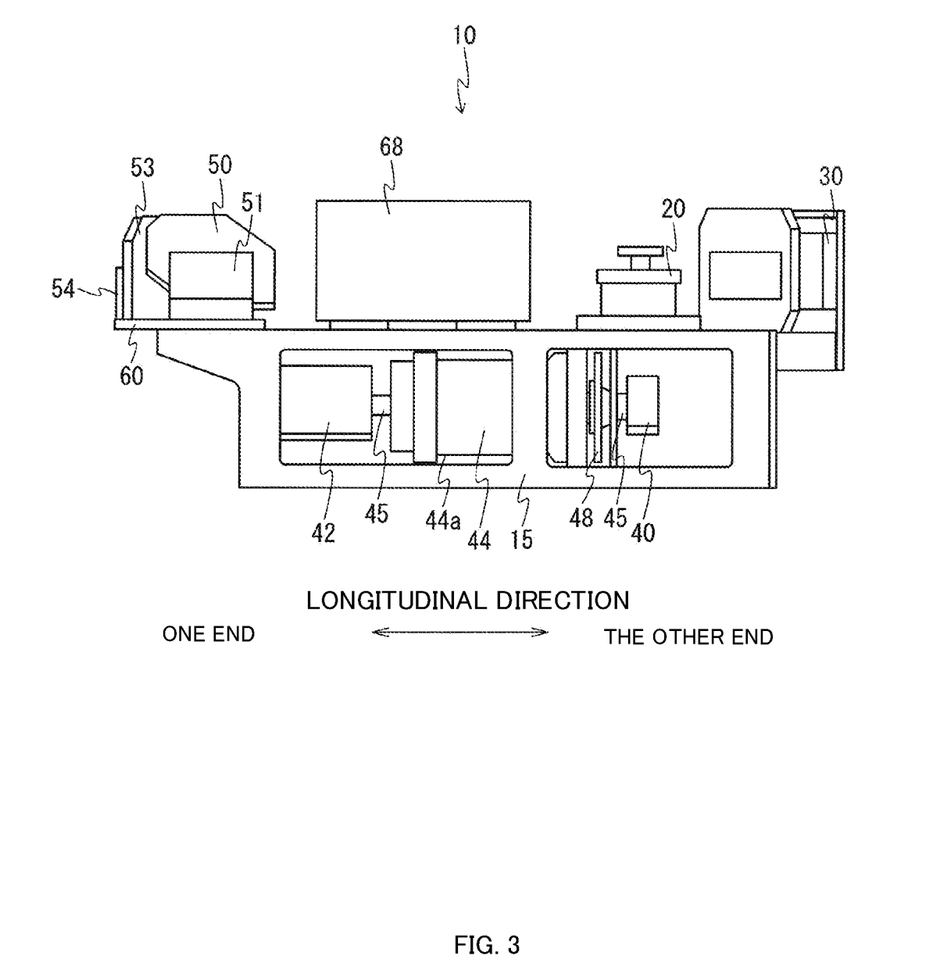
FIG. 3 is a front view of FIG. 2.
Figure 4:
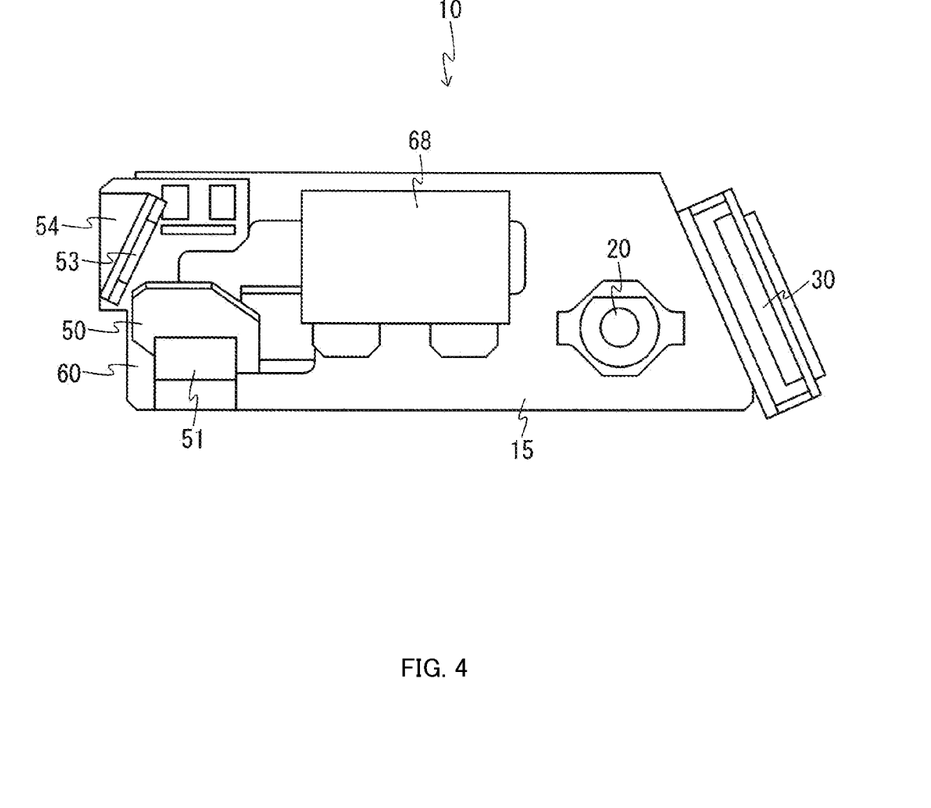
FIG. 4 is a planar view of FIG. 2.
Figure 5:
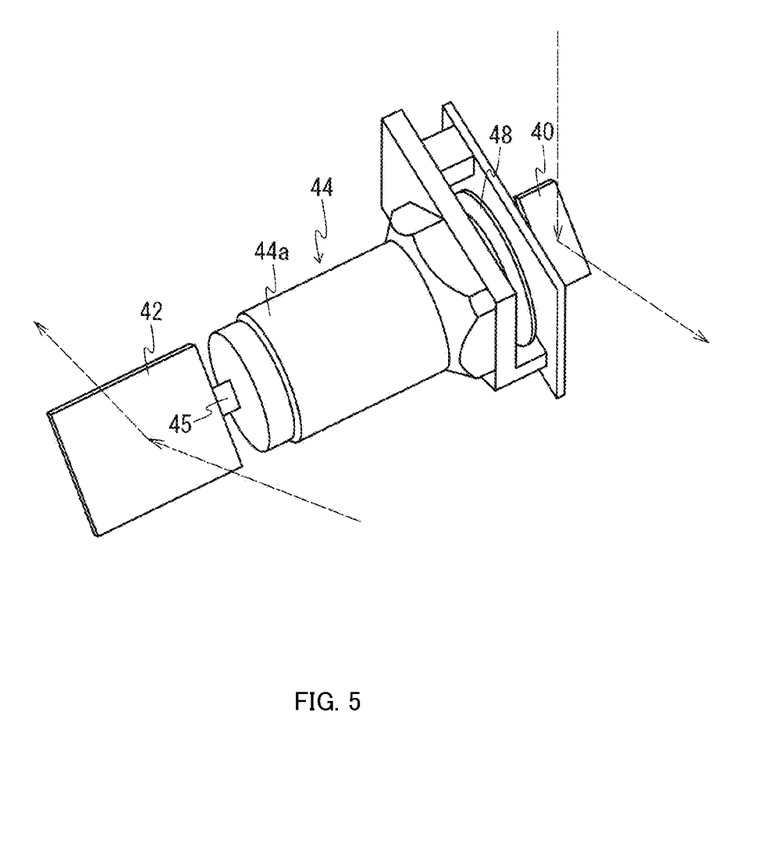
FIG. 5 is a schematic diagram illustrating configurations of an irradiating mirror 40, a light-receiving mirror 42, and a galvano motor 44.

FIG. 2 is a schematic perspective view illustrating the internal configuration of the non-contact probe 10. FIG. 3 is a front view of FIG. 2. FIG. 4 is a planar view of FIG. 2. FIG. 5 is a schematic diagram illustrating configurations of an irradiating mirror 40, a light-receiving mirror 42, and a galvano motor 44. In FIGS. 2 to 4, for convenience of explanation, an outer cover of the non-contact probe 10 is omitted. In FIG. 5, the traveling direction of a laser beam is indicated by a broken arrow.

As shown in FIG. 2, the non-contact probe 10 includes a frame part 15, a irradiating part 20, a light receiving part 30, the irradiating mirror 40, the light-receiving mirror 42, the galvano motor 44, reflection mirrors 50 and 53, a fixing plate member 60, and a focusing lens 68. In the present embodiment, the irradiating mirror 40 corresponds to a first mirror, and the light-receiving mirror 42 corresponds to a second mirror.

The frame part 15 forms a skeleton of the non-contact probe 10, and is made of a metal material. An opening part is formed in the frame part 15 so that the laser beam radiated by the irradiating part 20 and the reflected light from the workpiece can pass through the opening part. The frame part 15 supports the irradiating part 20, the light receiving part 30, the galvano motor 44, the focusing lens 68, and the like. Specifically, the galvano motor 44 is supported inside the frame part 15, and the irradiating part 20, the light receiving part 30, and the focusing lens 68 are supported on an upper portion of the frame part 15. The frame part 15 may be made of engineering plastic such as aluminum, a magnesium alloy, polycarbonate, or carbon fiber reinforced plastic. This makes it possible to reduce the weight of the non-contact probe 10.

As shown in FIG. 3, the irradiating part 20 is located at one end of the frame part 15 in the longitudinal direction. The light source 22 (FIG. 1) and a lens such as a collimator lens are disposed inside the irradiating part 20.

As shown in FIG. 3, the light receiving part 30 is located at one end of the frame part 15 in the longitudinal direction. The light receiving part 30 is provided with the imaging sensor 32 (FIG. 1) that receives the reflected light from the workpiece (specifically, the reflected light that passed through the focusing lens 68).

The irradiating mirror 40 reflects the laser beam from the irradiating part 20 toward the workpiece. In the frame part 15, the irradiating mirror 40 is located at one end in the longitudinal direction and immediately below the irradiating part 20, as shown in FIG. 3. The irradiating mirror 40 is swingable so that an irradiation direction of the laser beam can be adjusted. The laser beam reflected by the irradiating mirror 40 passes through the opening part of the frame part 15 and reaches the workpiece.

The light-receiving mirror 42 is a mirror that reflects the reflected light from the workpiece. In the frame part 15, the light-receiving mirror 42 is located at the other end in the longitudinal direction, as shown in FIG. 3. The light-receiving mirror 42 can swing in conjunction with the irradiating mirror 40. The reflected light reflected by the light-receiving mirror 42 passes through the opening part of the frame part 15 and reaches the reflection mirror 50.

The galvano motor 44 is a motor capable of swinging both the irradiating mirror 40 and the light-receiving mirror 42. Specifically, the galvano motor 44 simultaneously swings the irradiating mirror 40 and the light-receiving mirror 42. As shown in FIG. 3, the galvano motor 44 includes a motor shaft 45 extending from the ends of a motor body 44a. The motor shaft 45 pierces through the motor body 44a.

The irradiating mirror 40 is provided at one axial end of the motor shaft 45, and the light-receiving mirror 42 is provided at the other axial end of the motor shaft 45. Specifically, the irradiating mirror 40 is fixed to a D-cut portion at one axial end portion of the motor shaft 45, and the light-receiving mirror 42 is fixed to a D-cut portion at the other axial end portion of the motor shaft 45. That is, the motor shaft 45 supports the irradiating mirror 40 and the light-receiving mirror 42 at respective ends thereof.

When the irradiating mirror 40 and the light-receiving mirror 42 are disposed at the ends of the motor shaft 45 in this manner, the weight of each mirror can be reduced as compared with the case where the irradiating mirror 40 and the light-receiving mirror 42 are disposed integrally on one end of the motor shaft 45, and the load torque of the galvano motor 44 can be reduced. Therefore, it becomes easy to downsize the galvano motor 44. In addition, when the motor shaft 45 supports the irradiating mirror 40 and the light-receiving mirror 42 at respective ends, the postures of the irradiating mirror 40 and the light-receiving mirror 42 are more likely to be stabilized than when the motor shaft 45 supports the irradiating mirror 40 and the light-receiving mirror 42 in a cantilevered manner. As a result, the radiation of the laser beam and the reception of the reflected light can be performed with high accuracy (in other words, it is possible to prevent an occurrence of an error in a light receiving position of the reflected light in the light receiving part 30).

The weight of the irradiating mirror 40 is lighter than the weight of the light-receiving mirror 42. Further, the size of the irradiating mirror 40 is smaller than the size of the light-receiving mirror 42. Preferably, the size of the irradiating mirror 40 is equal to or smaller than half the size of the light-receiving mirror 42. This is because the irradiating part 20 irradiates the irradiating mirror 40 with the laser beam at a spot, and a reflection position of the laser beam at the irradiating mirror 40 hardly varies even when the irradiating mirror 40 swings, so that the irradiating mirror 40 is made smaller. By reducing the size of the irradiating mirror 40, the load torque of the galvano motor 44 can be further reduced.

A rotary encoder 48 is attached to the motor shaft 45. The rotary encoder 48 detects a rotational position and a rotational speed of the galvano motor 44. The rotary encoder 48 is provided between the motor body 44a and the irradiating mirror 40 in the motor shaft 45. That is, the rotary encoder 48 is disposed nearer to the irradiating mirror 40, which is small in size. As a result, a weight difference between one end side and the other end side when viewed from the motor body 44a can be reduced, so that the rotation of the galvano motor 44 can be stabilized.

The rotary encoder 48 can be configured with a type of rotary encoder (an absolute encoder) that is capable of outputting an absolute signal. Since the absolute encoder is an encoder that outputs an absolute value of a rotation angle, the rotary encoder 48 can measure the absolute value of the rotation angle of the irradiating mirror 40 and the absolute value of the rotation angle of the light receiving mirror 42. This eliminates the need for reference positioning of the rotary encoder 48 at the time of activation, thereby reducing the initial setting time taken for activation. The rotary encoder 48 is not limited to the above, and may be configured with a type of rotary encoder that is capable of outputting an incremental signal and a Z-phase signal (reference position signal).

Figure 6:
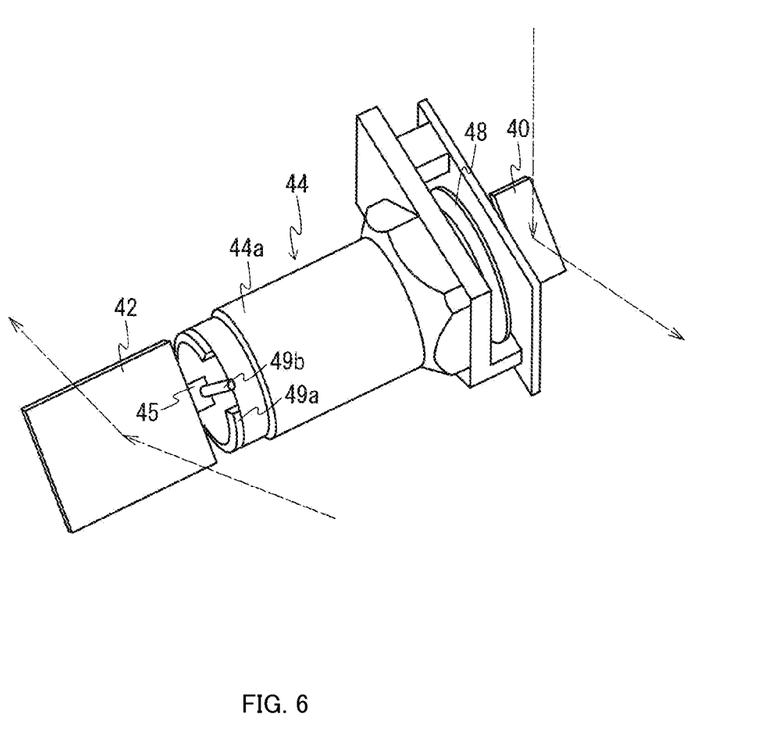
FIG. 6 is a schematic diagram illustrating a variation example.

FIG. 6 is a schematic diagram illustrating a variation example. As shown in FIG. 6, a regulation block 49a may be provided on a stator side of the galvano motor 44, and a stopper part 49b may be provided on a rotor side. The regulation block 49a is formed by cutting out a part of a cylindrical block. The stopper part 49b is attached to the motor shaft 45 in a manner to be swingable together with the motor shaft 45. When the galvano motor 44 swings the irradiating mirror 40 and the light-receiving mirror 42, the stopper part 49b regulates the swing by abutting against the regulation block 49a. In this case, the rotary encoder 48 may output a signal corresponding to a position where the stopper part 49b abutted against the regulation block 49a to perform reference positioning. This makes it possible to accurately perform reference positioning at the time of activation. Further, the size and weight of the rotary encoder according to the variation example can be made more compact than those of the absolute rotary encode inexpensively.

The reflection mirrors 50 and 53 are provided above the light-receiving mirror 42, and reflect the reflected light reflected by the light-receiving mirror 42 toward the light receiving part 30. Specifically, the reflection mirror 50 reflects the reflected light from the light-receiving mirror 42 to the reflection mirror 53, and the reflection mirror 53 reflects said reflected light toward the focusing lens 68. The reflection mirrors 50 and 53 are provided at positions apart from each other on the frame part 15.

As shown in FIG. 3, the reflection mirrors 50 and 53 are located at the other end of the frame part 15 in the longitudinal direction. That is, the reflection mirrors 50 and 53 are located on the opposite side of the irradiating part 20. Therefore, the reflection mirrors 50 and 53 are less likely to be affected by heat generated by the irradiating part 20. Disposing the irradiating mirror 40 and the light-receiving mirror 42 apart from each other at the ends of the motor shaft 45 increases the degree of freedom in terms of the installation position of the reflection mirrors 50 and 53 and the irradiating part 20.

The reflection mirror 50 is supported by a support member 51, and the reflection mirror 53 is supported by a support member 54. The support members 51 and 54 are made of ceramics, for example, and have heat insulating properties. Since the support members 51 and 54 have heat insulating properties, it is possible to prevent or reduce conduction of heat from the frame part 15 to the reflection mirrors 50 and 53.

The reflection mirrors 50 and 53 are not directly supported by the frame part 15, but are supported via the fixing plate member 60. The fixing plate member 60 is provided on the frame part 15. Specifically, the fixing plate member 60 is supported at two locations on the upper portion of the other end of the frame part 15 in the longitudinal direction. The reflection mirrors 50 and 53 are fixed to the fixing plate member 60. Although two reflection mirrors 50 and 53 are provided in the above description, the present disclosure is not limited thereto. The number of reflection mirrors that reflect the reflected light reflected by the light-receiving mirror 42 toward the light receiving part 30 may be one.

In the present embodiment, a linear expansion coefficient of the fixing plate member 60 is smaller than a linear expansion coefficient of the frame part 15. Specifically, the fixing plate member 60 is formed of a titanium plate, and a linear expansion coefficient of the titanium plate is smaller than a linear expansion coefficient of the material forming the frame part 15. Therefore, since the degree of heat change of the fixing plate member 60 is small even when the heat rises, a change in the relative positions of the reflection mirrors 50 and 53 fixed to the fixing plate member 60 can be reduced. As a result, it is possible to prevent an occurrence of an error in the light receiving position of the reflected light in the light receiving part 30.

Figure 7:
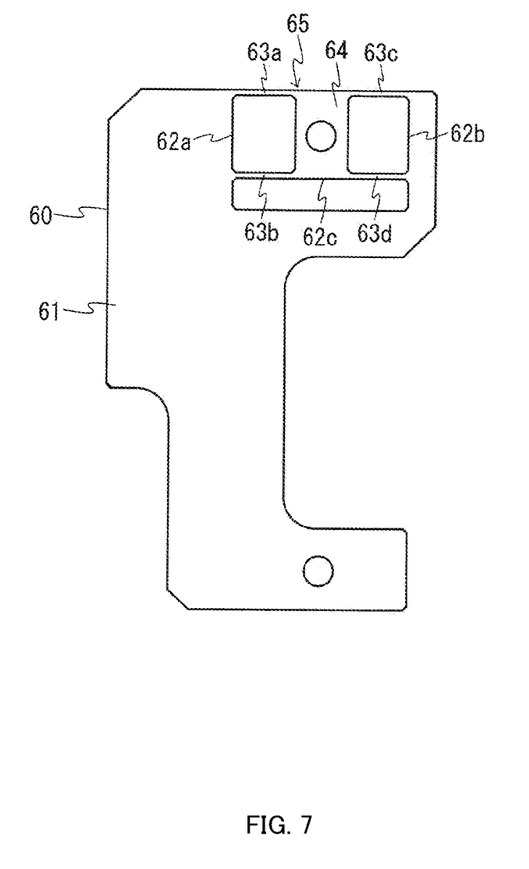
FIG. 7 is a schematic diagram illustrating a detailed configuration of a fixing plate member 60.

FIG. 7 is a schematic diagram illustrating a detailed configuration of the fixing plate member 60. The fixing plate member 60 includes a flat plate part 61, a plurality of holes 62a, 62b, and 62c, a plurality of narrow portions 63a, 63b, 63c, and 63d, and a connection portion 64.

The flat plate part 61 is formed of sheet metal having a predetermined thickness. The holes 62a, 62b, and 62c are formed in the flat plate part 61 at positions away from a portion where the reflection mirrors 50 and 53 are fixed. The holes 62a to 62c are formed adjacent to each other at one corner of the flat plate part 61.

The narrow portions 63a, 63b, 63c and 63d are each a portion having a narrow width, and are adjacent to the holes 62a to 62c. The widths of the narrow portions 63a to 63d are each equal to or less than the thickness of the flat plate part 61, for example. Since the rigidity of the narrow portions 63a to 63d is lower than that of other portions, the narrow portions 63a to 63d are likely to deform when a force is applied.

The connection portion 64 is a portion connected to the four narrow portions 63a to 63d. The holes 62a to 62d are located around the connection portion 64. In the present embodiment, the four narrow portions 63a to 63d and the connection portion 64 function as a deformation part 65 which deforms when the frame part 15 thermally expands.

Figure 8:
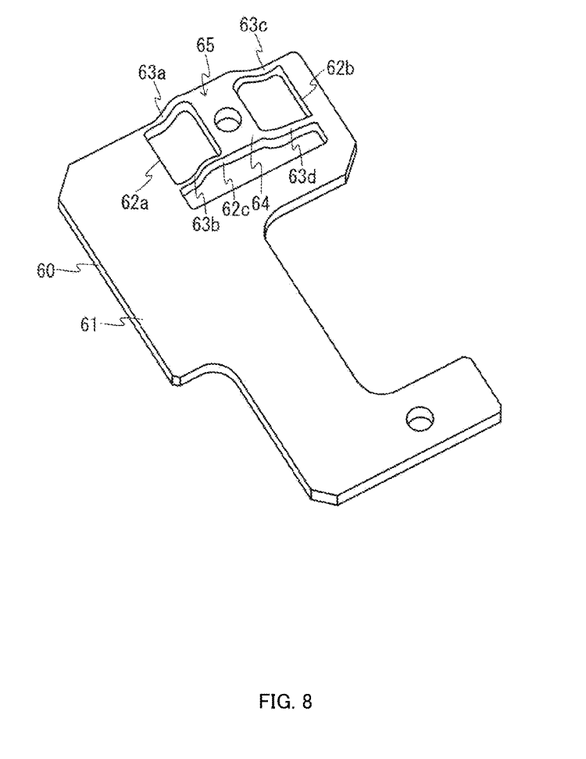
FIG. 8 is a schematic diagram illustrating a state of a deformation part 65 when a frame part 15 has thermally expanded.

FIG. 8 is a schematic diagram illustrating a state of the deformation part 65 when the frame part 15 thermally expands. When the frame part 15 thermally expands, the deformation part 65 having low rigidity in the fixing plate member 60 in contact with the frame part 15 receives a force from the frame part 15 and deforms, as shown in FIG. 8. In FIG. 8, the narrow portions 63a to 63d deform so as to be bent, and the connection portion 64 is located so as to swell with respect to the flat plate part 61. Since the deformation part 65 deforms in this manner, the fixing plate member 60 functions to absorb the thermal expansion of the frame part 15. Therefore, even when the frame part 15 thermally expands, a change in the relative positions of the reflection mirrors 50 and 53 can be prevented.

The focusing lens 68 focuses light onto the light receiving part 30. Specifically, the focusing lens 68 focuses light onto an imaging surface of the imaging sensor 32. Although the non-contact probe 10 is provided in the profile measurement apparatus 1 in the above-mentioned embodiment, the present disclosure is not limited thereto. For example, the non-contact probe 10 may be applied to a coordinate measuring machine that measures three-dimensional coordinates of a workpiece.

Effect of the Present Embodiment

In the non-contact probe 10 of the present embodiment, the irradiating mirror 40 that reflects the laser beam from the irradiating part 20 toward the workpiece is provided at one axial end of the motor shaft 45 that extends on the ends of the galvano motor 44, and the light-receiving mirror 42 that reflects the reflected light from the workpiece is provided at the other axial end of the motor shaft 45. That is, the motor shaft 45 supports the irradiating mirror 40 and the light-receiving mirror 42 at respective ends thereof. When the irradiating mirror 40 and the light-receiving mirror 42 are disposed on the ends of the motor shaft 45, the weight of each mirror can be reduced and the load torque of the galvano motor 44 can be reduced as compared with the case where the irradiating mirror 40 and the light-receiving mirror 42 are disposed integrally at one end of the motor shaft 45. Therefore, it becomes easy to downsize the galvano motor 44. In addition, when the motor shaft 45 supports the irradiating mirror 40 and the light-receiving mirror 42 at respective ends thereof, postures of the irradiating mirror 40 and the light-receiving mirror 42 are more likely to be stabilized than when the motor shaft 45 supports the irradiating mirror 40 and the light-receiving mirror 42 in a cantilevered manner.

The present disclosure is explained based on the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

The invention claimed is:
1. A non-contact probe comprising:
an irradiating part that radiates a laser beam;
a first mirror that reflects the laser beam from the irradiating part toward a workpiece;
a second mirror that reflects a reflected light from the workpiece;
a galvano motor capable of swinging both the first mirror and the second mirror;
a frame part on which the irradiating part and the galvano motor are supported;
a reflection mirror that reflects a reflected light reflected by the second mirror toward a light receiving part; and
a fixing plate member provided on the frame part and to which the reflection mirror is fixed, wherein
the first mirror is provided at a first axial end of a motor shaft that extends on both ends of the galvano motor,
the second mirror is provided at a second axial end of the motor shaft,
a weight of the first mirror is lighter than a weight of the second mirror,
the non-contact probe further comprises a rotary encoder provided between a motor body and the first mirror in the motor shaft, and
in the fixing plate member, a deformation part which deforms when the frame part thermally expands is provided at a position away from a portion where the reflection mirror is fixed.

2. The non-contact probe according to claim 1, wherein a size of the first mirror is equal to or smaller than half the size of the second mirror.

3. The non-contact probe according to claim 1, wherein the reflection mirror is a plurality of mirrors provided at positions apart from each other, and a linear expansion coefficient of the fixing plate member is smaller than a linear expansion coefficient of the frame part.

4. The non-contact probe according to claim 1, wherein the reflection mirror is fixed to the fixing plate member via a support member having heat insulating properties.

5. The non-contact probe according to claim 1, wherein the fixing plate member has a plurality of holes, and
the deformation part has a plurality of narrow portions adjacent to the holes.

6. The non-contact probe according to claim 5, wherein a width of each of the plurality of narrow portions is equal to or less than a thickness of the fixing plate member.

7. The non-contact probe according to claim 1, wherein the irradiating part is positioned on a first end of the frame part in a longitudinal direction, and
the reflection mirror is positioned on a second end in the longitudinal direction.

8. The non-contact probe according to claim 1, wherein the rotary encoder outputs an absolute signal and is capable of measuring an absolute value of a rotation angle of the first mirror and an absolute value of a rotation angle of the second mirror.

9. The non-contact probe according to claim 1, wherein the galvano motor includes:
a regulation block provided on a stator side thereof, and
a stopper part that is provided on a rotor side thereof and abuts against the regulation block when the galvano motor swings, and
the rotary encoder outputs a signal corresponding to a position where the stopper part abuts against the regulation block.

* * * * *